No. 828,960. PATENTED AUG. 21, 1906.
C. J. OLSON.
BOX JOINT.
APPLICATION FILED JULY 28, 1905.
2 SHEETS—SHEET 1.
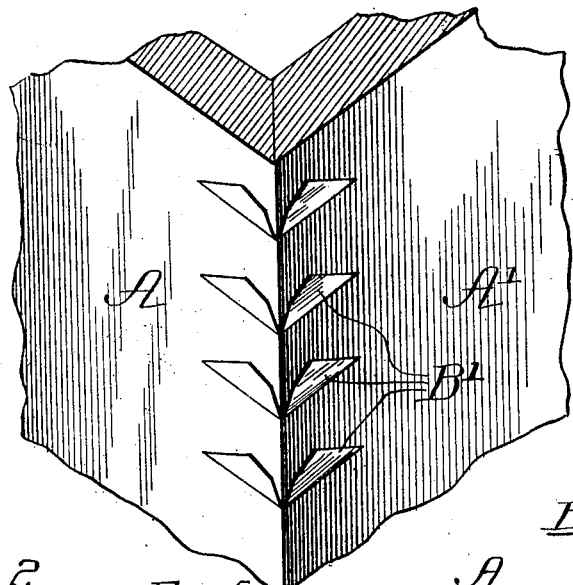
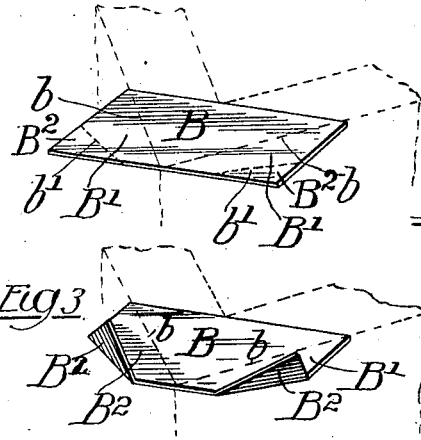
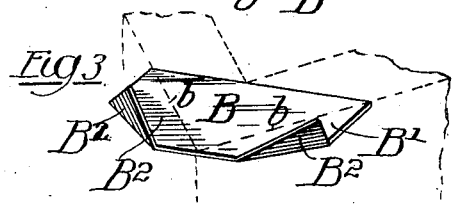
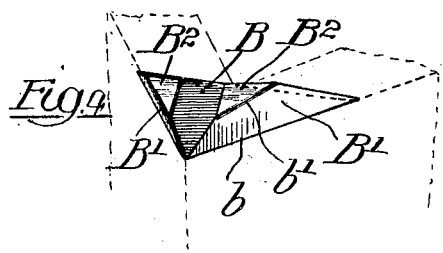
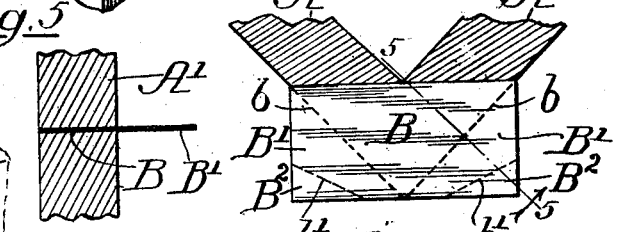
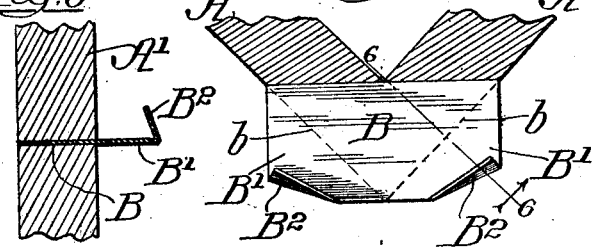
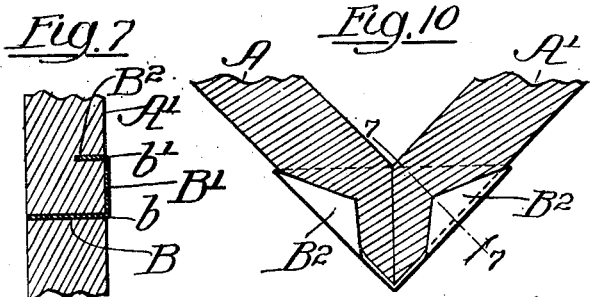
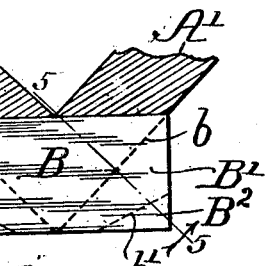
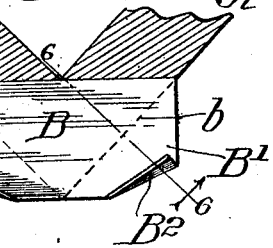
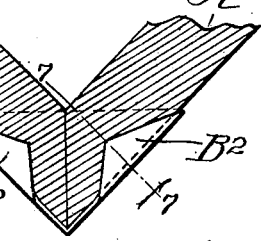
Inventor:
Charles J. Olson
by Poole & Brown
his Attys No. 828,960. PATENTED AUG. 21, 1906.
C. J. OLSON.
BOX JOINT.
APPLICATION FILED JULY 28, 1905.

2 SHEETS—SHEET 2.

Witnesses:
N. G. Barrett
E. R. Watkins

Inventor:
Charles J. Olson
by Poole & Brown
his Attys.

UNITED STATES PATENT OFFICE.

CHARLES J. OLSON, OF CHICAGO, ILLINOIS, ASSIGNOR OF ONE-HALF TO SIGMUND GOLDSTEIN, OF CHICAGO, ILLINOIS.

BOX-JOINT.

No. 828,960.        Specification of Letters Patent.        Patented Aug. 21, 1906.

Application filed July 28, 1905. Serial No. 271,688.

*To all whom it may concern:*

Be it known that I, CHARLES J. OLSON, a citizen of the United States, and a resident of Chicago, in the county of Cook and State of Illinois, have invented certain new and useful Improvements in Box-Joints; and I do hereby declare that the following is a full, clear, and exact description thereof, reference being had to the accompanying drawings, and to the letters of reference marked thereon, which form a part of this specification.

This invention relates to features of construction in the joints for the corners of wooden boxes or for uniting two pieces of wood or the like which meet each other at an angle, of that kind in which the pieces or walls to be joined are united by means of sheet-metal clips or clasps having holding-prongs which penetrate the adjacent marginal portions of the pieces or walls, so as to hold or lock the same firmly together.

The invention consists in the matters hereinafter described, and pointed out in the appended claims.

In a joint made in accordance with my invention the meeting margins of the walls to be joined are beveled to form a mitered joint, and said walls are secured together by a plurality of metal clips or clasps, each having a central flat body portion which is inserted edgewise into the marginal parts of both walls and provided with marginal flaps or wings which are bent at an angle to the said central or body portion into contact with the outer surfaces of the walls and are provided with holding-prongs which penetrate said walls, so as to form a secure and permanent connection of both ends of the clip with both of the walls to be joined.

Figure 11:
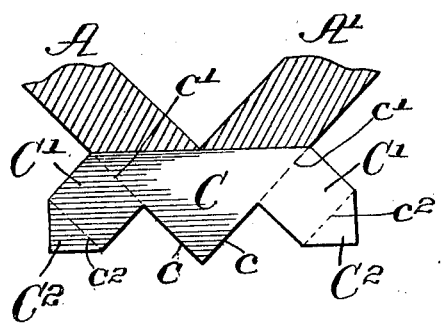
Figure 14:
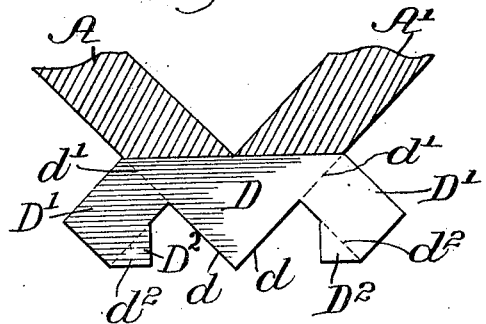
Figure 12:
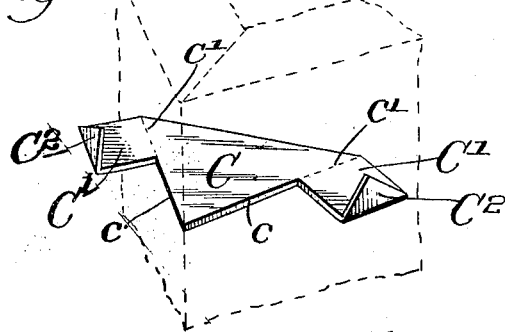
Figure 15:
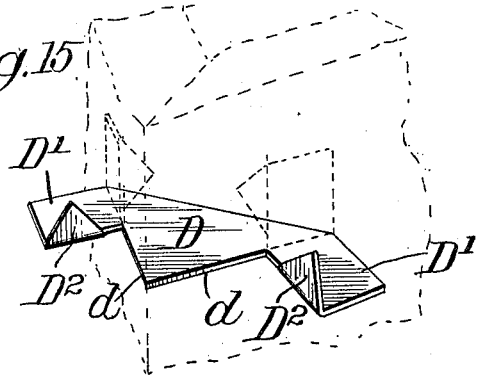
Figure 13:
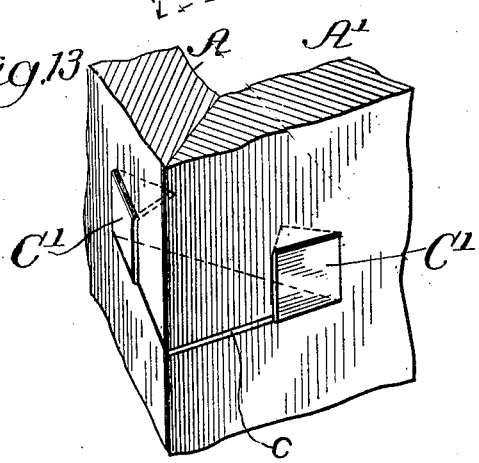
Figure 16:
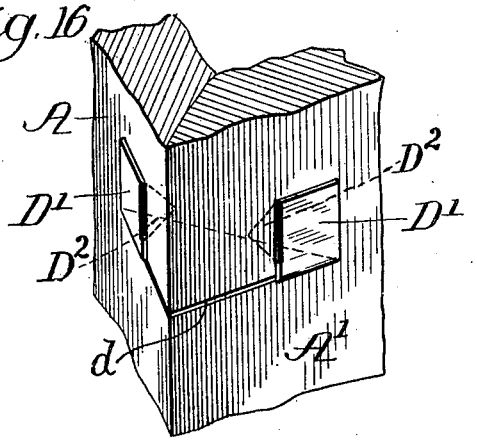

As shown in the accompanying drawings, Figure 1 is a perspective view showing the meeting edges of two box-walls joined by sheet-metal clips made in accordance with my invention. Fig. 2 is a perspective view of one of the flat blanks from which the clips are formed, the dotted lines showing the meeting margins of the side walls of the box in their relation to said blank before the latter is bent to form the clip. Fig. 3 is a perspective view like Fig. 2, but showing the two outer corners of the blank bent at an angle to the body thereof to form the holding-prongs. Fig. 4 is a perspective view showing the clip in its completed form. Fig. 5 is a sectional view on line 5 5 of Fig. 8, taken through one of the box-walls and the flat blank shown in Fig. 1. Fig. 6 is a like section taken on line 6 6 of Fig. 9, showing the blank when the prongs thereof are bent as shown in Fig. 3. Fig. 7 is a sectional view taken upon line 7 7 of Fig. 10 through one of the box-walls and the finished clip. Fig. 8 is a sectional view of the box-corner, taken on the plane of the flat blank shown in Figs. 2 and 5. Fig. 9 is a like section showing the blank in plan view when bent as shown in Figs. 3 and 6. Fig. 10 is a like section showing the clip when the same is completed. Fig. 11 is a plan section through the meeting edges of the box-walls in the plane of the flat blank, showing a modified form of said blank. Fig. 12 is a perspective view showing the blank illustrated in Fig. 11 when the prongs are bent from the plane of the blank, the box-walls being shown in dotted lines. Fig. 13 is a perspective view of the corner of the box, showing a completed clip made from the blank shown in Fig. 11. Fig. 14 is a plan section through the meeting edges of the walls of a box, showing in plan view a flat blank of a still different form. Fig. 15 is a perspective view of the blank shown in Fig. 14 with the holding-prongs bent from the body of the blank, the side walls of the box being shown in dotted lines. Fig. 16 is a perspective view of the corner of a box, showing a completed clip made from the blank shown in Figs. 14 and 15.

As illustrated in said drawings, A A' indicate the two box-walls which are to be joined to form one corner of the box. Said walls A A' are provided with beveled meeting edges, forming a mitered joint. In the preferred form of the sheet-metal clip illustrated in Figs. 1 to 10 each clip embraces a central or body portion B, which is flat and of triangular shape and is inserted into the meeting edges of the box-walls A A' at right angles to the meeting faces of the beveled edges or perpendicular to the outer side faces of the box-walls. At each end of said body portion and connected with the same along the oblique line of folds $b$ are two flaps or wings B' B', which rest flat against the outer faces of the side walls of the box, and on the outer margins of the said wings B' B' are holding-prongs $B^2$ $B^2$, bent substantially at right angles to the said wings B' B' and which enter or penetrate the said side walls. The prongs $B^2 B^2$ are shown in Figs. 3, 6, and 9 as bent at an angle greater than a right angle relatively to the wings $B' B'$, the prongs being so bent to insure their proper entrance into the wood of the walls when the wings are bent against said walls in the process preferably employed in applying the clips, such process consisting in forcing the central part of the flat blank edgewise into the meeting edges of the walls, then bending the prongs $B^2 B^2$ into the position shown in Figs. 3, 6, and 9, and then bending the wings $B' B'$ flat against the outer faces of the walls and at the same time forcing the said prongs into said walls.

The holding-prongs $B^2 B^2$ in the clip shown in Figs. 1 to 10 are joined to the wings $B' B'$ along lines of fold $b' b'$, which are oblique with respect to the lines of folds $b b$, so that the said prongs $B^2 B^2$ when the clip is completed are in planes oblique to the body $B$ of the clips. The walls $A A'$ when made of wood will usually constitute the end and side walls of the box and the grain of the wood will run parallel with the top and bottom edges of the said side walls and transverse to the meeting ends thereof, so that when the bodies of the sheet-metal clips are inserted they will enter the grain endwise thereof, and the result of the oblique arrangement described in the prongs $B^2 B^2$ is to bring the flat faces of said prongs in angular relation to the grain of the wood, so that they will be prevented from cutting edgewise through the grain under strain or pressure tending to separate the walls laterally from each other. A much stronger connection between the end walls is thus provided than would be afforded if the said prongs were parallel with the body part $b$ and with the grain of the wood.

The perspective view, Fig. 4, shows the completed clip above described separate from the box, while Figs. 2 and 8 show the rectangular blank from which the clip shown in said Fig. 4 is made, the dotted lines $b$ and $b'$ on said Figs. 2 and 8 indicating the lines on which the wings and prongs are bent. Figs. 3, 6, and 9 illustrate the intermediate step in the bending of the blank to bring it into the form of the completed clip. A clip made as illustrated in said Figs. 1 to 10 will be applied to the box by first inserting the flat blank shown in Figs. 2, 5, and 8 edgewise into the meeting margins of the sides to be joined, as shown in Fig. 8, then bending the extremities of the outer corner portions of the rectangular blank along the oblique lines $b' b'$, so as to form the prongs $B^2 B^{2'}$, and then bending the entire outer corner portions along the oblique lines $b' b'$ coinciding with the planes of the outer surfaces of the walls $A A$, so as to bring the wings $B' B'$ thereby formed flat against the outer faces of the two side walls, while at the same time forcing the prongs $B^2 B^2$ into the said side walls.

In Figs. 11 to 13 I have shown a modified form of clip, the blank for which consists of a central or body portion $C$ generally of triangular shape and having two outer margins $c c$ at right angles to each other, which conicide with the side faces of the box when the clip is inserted therein. At the end portions of the blank are formed outwardly-projecting wings $C' C'$, arranged generally at right angles to the angular margins $c c$ and adapted to be folded at right angles to said margins along the folding-lines $c' c'$. On the extremities of of the folding sections $C' C'$ are prongs $C^2 C^2$, preferably of triangular or pointed form, the same being adapted to be folded along the lines of fold $c^2 c^2$, parallel with the lines of fold $c' c'$. The said clip $C$ is inserted into the meeting edges of the two side walls to be joined in the same manner as hereinbefore described with their oblique margins $c c$ flush with the outer surfaces of the side walls of the box. The wings $C'$ are bent at right angles to the body portion $C$, so as to rest flat against the outer surfaces of the side walls $A A'$, and the prongs $C^2 C^2$ are bent at right angles to the wings $C' C'$ and penetrate the said side walls. In this instance the lines of fold $c' c^2$ being parallel with each other the prongs $C^2 C^2$ are parallel with the body $C$. This construction does not afford as strong a joint for wooden boxes as that provided by the construction shown in Figs. 1 to 10, because the prongs $C^2 C^2$ are parallel with the grain of the wood, but is suitable for use in connection with boxes used for many purposes.

In Figs. 14 to 16 I have shown a clip generally similar to that shown in Figs. 11 to 13, last above described. In this case the blank has a body portion $D$ of triangular form, with angular outer edges $d d$, and is provided with wings $D' D'$, folded on lines $d' d'$ like the corresponding wings $C' C'$ of Figs. 11 to 13. The holding-prongs $D^2 D^2$ in this instance project from the side margins of the wings $D' D'$, the lines of fold $d^2 d^2$ between the prongs $D^2 D^2$ and the wings $D' D'$ being at right angles to the lines of fold $d' d'$ between said wings and the body $D$, thus bringing the flat faces of the said prongs $D^2$ perpendicular with respect to the plane of the body $D$, so that the said prongs enter the grain of the wood transverse thereto or parallel with the meeting end margins of the box-walls.

Manifestly in either of the several forms of clips described the wings may be provided each with a plurality of holding-prongs instead of with a single prong, as illustrated.

While I have shown several different forms in which the clip embodying my invention may be constructed, it will be understood that a clip embracing the same general features of construction may be made in variously-modified forms, the main feature of such clip being that it has a body portion which is inserted into meeting edges of both side walls to be joined and wings provided with holding-prongs which penetrate the side walls when the said wings rest against the outer faces of said side walls.

The form of clip first described and shown in Figs. 1 to 10 has the advantage of being made from a plain rectangular blank which may be cut from sheet metal without waste or the use of special dies and which at the same time affords a very strong joint, because the bases of the wings extend the full length of the parts of the blank which intersect the outer faces of the side walls of the box, so that said wing-sections as well as the prongs thereon are made very stiff and rigid, and therefore unlikely to be distorted under strains tending to separate the walls of the box. A clip made from a rectangular blank, as shown in said last-mentioned figures, has, moreover, the advantage that it may be readily applied to the box by the use of a machine such, for instance, as is illustrated in my separate application for Letters Patent, filed in the United States Patent Office on the 9th day of September, 1905, Serial No. 277,707.

I claim as my invention—

1. The combination with two box-walls or like parts which are joined at their margins in angular relation to each other, of a sheet-metal joint-clip comprising a flat, central or body portion which is inserted into the meeting margins of said walls, wings on the said body portion in contact with the outer surfaces of said walls, and holding-prongs on the said wings which penetrate said walls.

2. The combination with two box-walls or the like, which are joined at their margins in angular relation to each other of a sheet-metal joint-clip comprising a flat, central or body portion which is inserted into the meeting margins of said walls, wings connected with the said body portion and arranged at right angles to said body portion and in angular relation to each other, and holding-prongs connected with the wings and penetrating the walls.

3. A sheet-metal joint-clip for uniting the meeting edges of two box-walls or like parts to be joined comprising a flat, central or body portion having one straight, plain margin, wings extending from the margins of said body portion adjacent to the plain margin and folded at an angle to said body portion and in angular relation to each other, and prongs on the margins of said wings bent at an angle to the latter.

4. A sheet-metal joint-clip for uniting the meeting edges of two box-walls or like parts to be joined, comprising a flat, central or body portion, wings extending from the outer margins of said body portion and folded at an angle thereto in angular relation to each other, and prongs on the margins of said wings bent at an angle to the latter, along lines of fold which are oblique with respect to the lines of fold between the wings and the said body portion.

5. A sheet-metal joint-clip consisting of a rectangular blank having a central flat body, two wings bent at an angle to said central body portion along lines of fold at an angle to each other and intersecting one of the side margins of the rectangular blank at the center of said side margin, and holding-prongs formed by bending the corner portions of said wings at an angle to the latter.

6. A sheet-metal joint-clip consisting of a rectangular blank having a central flat body, two wings bent at an angle to said central body portion along lines of fold at an angle to each other and intersecting one of the side margins of the rectangular blank at the center of said side margin, and holding-prongs formed by bending the corner portions of said wings at an angle to the latter along lines of fold which are oblique with respect to the lines of fold between the wings and the said body portion.

In testimony that I claim the foregoing as my invention I affix my signature, in presence of two witnesses, this 19th day of July, A. D. 1905.

CHARLES J. OLSON.

Witnesses:
C. CLARENCE POOLE,
G. R. WILKINS.